United States Patent
Lin et al.

(10) Patent No.: US 10,733,197 B2
(45) Date of Patent: Aug. 4, 2020

(54) METHOD AND APPARATUS FOR PROVIDING INFORMATION BASED ON ARTIFICIAL INTELLIGENCE

(71) Applicant: Beijing Baidu Netcom Science and Technology Co., Ltd., Beijing (CN)

(72) Inventors: Jiaxin Lin, Beijing (CN); Wei Bi, Beijing (CN); Tixi He, Beijing (CN); Zhisheng Wang, Beijing (CN); Yingbin Su, Beijing (CN); Yuhui Cao, Beijing (CN); Rui Chen, Beijing (CN); Zhihui Liu, Beijing (CN); Yan Zhang, Beijing (CN); Chao Zhou, Beijing (CN); Shuo Huang, Beijing (CN); Jingzhou He, Beijing (CN); Guyue Zhou, Beijing (CN); Shiwei Huang, Beijing (CN); Di Jiang, Beijing (CN); Lei Shi, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 381 days.

(21) Appl. No.: 15/845,713

(22) Filed: Dec. 18, 2017

(65) Prior Publication Data
US 2018/0181628 A1 Jun. 28, 2018

(30) Foreign Application Priority Data
Dec. 28, 2016 (CN) .......................... 2016 1 1233400

(51) Int. Cl.
G06F 16/2457 (2019.01)
G06F 16/248 (2019.01)
(Continued)

(52) U.S. Cl.
CPC ........ *G06F 16/248* (2019.01); *G06F 16/2457* (2019.01); *G06F 16/337* (2019.01);
(Continued)

(58) Field of Classification Search
CPC ...................................... G06F 15/16
(Continued)

(56) References Cited

U.S. PATENT DOCUMENTS

2011/0295612 A1* 12/2011 Donneau-Golencer ......................
G06Q 30/02
705/1.1
2013/0246521 A1* 9/2013 Schacht .............. H04L 67/1095
709/204
(Continued)

FOREIGN PATENT DOCUMENTS

CN 102611785 A 7/2012
CN 106202563 A 12/2016

OTHER PUBLICATIONS

Chinese Patent Application No. 201611233400.2, Office Action dated Aug. 5, 2019, 9 pages.
(Continued)

*Primary Examiner* — Baoquoc N To
(74) *Attorney, Agent, or Firm* — Lathrop GPM LLP

(57) ABSTRACT

The present disclosure provides a method and an apparatus for providing information based on artificial intelligence. The method includes: determining a characteristic of interest of the user according to historical access records of the user; and displaying an information card matched with the characteristic of interest in an information displaying interface, the information card including core contents of news matched with the characteristic of interest determined by analyzing news in a database.

18 Claims, 6 Drawing Sheets

(51) Int. Cl.
   *G06N 3/08* (2006.01)
   *G06K 9/00* (2006.01)
   *G06K 9/62* (2006.01)
   *G06F 16/9535* (2019.01)
   *G06F 16/335* (2019.01)
   *G06N 3/04* (2006.01)
(52) U.S. Cl.
   CPC ..... *G06F 16/9535* (2019.01); *G06K 9/00442* (2013.01); *G06K 9/627* (2013.01); *G06N 3/0427* (2013.01); *G06N 3/08* (2013.01)
(58) Field of Classification Search
   USPC ........................................................ 707/803
   See application file for complete search history.

(56) References Cited

U.S. PATENT DOCUMENTS

2014/0164365 A1* 6/2014 Graham ................ G06Q 50/01
                                                     707/723
2017/0041413 A1* 2/2017 Chandhok ............... H04L 67/26

OTHER PUBLICATIONS

Chinese Patent Application No. 201611233400.2, English translation of Office Action dated Aug. 5, 2019, 7 pages.

* cited by examiner

METHOD AND APPARATUS FOR PROVIDING INFORMATION BASED ON ARTIFICIAL INTELLIGENCE

This application is based on and claims priority to Chinese Patent Application No. 201611233400.2, filed on Dec. 28, 2016, the entire contents of which are incorporated herein by reference.

FIELD

The present disclosure relates to the field of webpage information processing, and more particularly, to a method and an apparatus for providing information based on artificial intelligence.

BACKGROUND

Artificial Intelligence is abbreviated as AI, which is a new technical science of studying and developing theories, methods, technics and application systems for simulating, extending and expanding human intelligence. Currently, Artificial Intelligence may be considered as a branch of computer science, which attempts to understand the substance of intelligence and generate a new kind of intelligence machine that can react in a similar way to human intelligence. Researches in the field of AI include robots, language recognition, image recognition, natural language processing, and expert systems, etc.

Currently, most news applications provide news information service to users via feed flow, a granularity of which is a single news release. Information related or similar to the news is provided to the user through relevant news service on the news text page.

However, by using the feed flow, the user may be provided with dozens or even hundreds of pieces of news at one time, and therefore the user may have to select useful information from a great quantity of news personally, resulting in the long screening process and great burden, reducing the speed of acquiring core information, and lowering the user experience.

SUMMARY

The present disclosure aims to solve at least one of the technical problems existing in the related art to at least some extent.

Accordingly, a first objective of the present disclosure is to provide a method for providing information based on artificial intelligence, so that the user may acquire core contents of news of interest directly, thus reducing operations and reading time of the user, increasing the efficiency of acquiring information, saving the traffic consumed by using an application, and reducing the cost.

A second objective of the present disclosure is to provide an apparatus for providing information based on artificial intelligence.

A third objective of the present disclosure is to provide a device for providing information based on artificial intelligence.

A fourth objective of the present disclosure is to provide a computer-readable storage medium.

To achieve the above objectives, embodiments according to a first aspect of the present disclosure provide a method for providing information based on artificial intelligence, including: determining a characteristic of interest of a user according to historical access records of the user; displaying an information card matched with the characteristic of interest of the user in an information displaying interface, the information card including core contents of news matched with the characteristic of interest determined by analyzing news in a database.

With the method for providing information based on AI according to embodiments of the present disclosure, the characteristic of interest of the user is determined according to historical access records of the user first, and then core contents of news matched with the characteristic of interest are displayed to the user in the information displaying interface. Thus, the user may acquire core contents of news of interest directly, reducing operations and reading time of the user, increasing the efficiency of acquiring information, reducing the traffic consumed by using an application for reading the news, and saving the cost.

To achieve the above objectives, embodiments according to a second aspect of the present disclosure provide an apparatus for providing information based on artificial intelligence, including: a first determining module, configured to determine a characteristic of interest of a user according to historical access records of the user; and a displaying module, configured to display an information card matched with the characteristic of interest of the user in an information displaying interface, the information card including core contents of news matched with the characteristic of interest determined by analyzing news in a database.

With the apparatus for providing information based on AI according to embodiments of the present disclosure, the characteristic of interest of the user is determined according to historical access records of the user first, and then core contents of news matched with the characteristic of interest are displayed to the user in the information displaying interface. Thus, the user may acquire core contents of news of interest directly, reducing operations and reading time of the user, increasing the efficiency of acquiring information, reducing the traffic consumed by using an application for reading the news and saving the cost.

To achieve the above objectives, embodiments according to a third aspect of the present disclosure provide a device for providing information based on artificial intelligence, including: a memory; a processor; and computer programs stored in the memory and executable by the processor, and configured to perform the method according to embodiments of the first aspect when executed by the processor.

To achieve the above objectives, embodiments according to a fourth aspect of the present disclosure provide a computer-readable storage medium, stored with computer programs that, when executed by a processor, cause the processor to perform the method according to embodiments of the first aspect.

BRIEF DESCRIPTION OF THE DRAWINGS

Above and/or additional aspects and advantages of the present disclosure will become apparent and more easily to understand from the following descriptions of the embodiments of the present disclosure with reference to the drawings.

DETAILED DESCRIPTION

Figure 1:
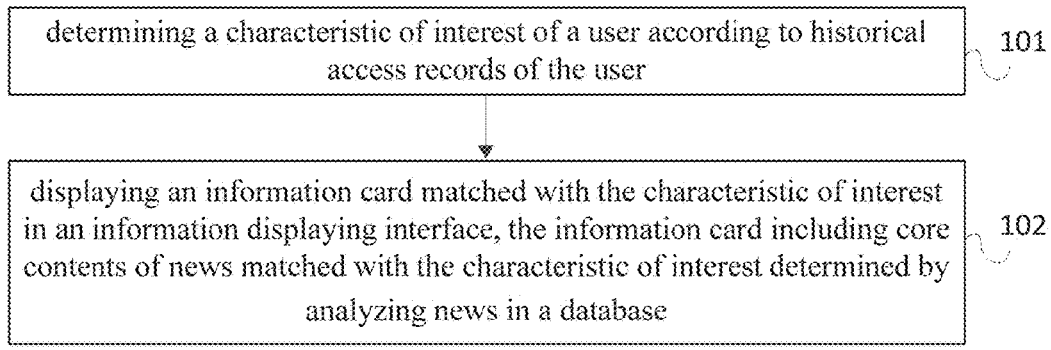
FIG. 1 is a flow chart of a method for providing information based on artificial intelligence according to an embodiment of the present disclosure.

Reference will now be made in detail to exemplary embodiments, examples of which are illustrated in the accompanying drawings, wherein the same or similar elements and the elements having same or similar functions are denoted by like reference numerals throughout the descriptions. Embodiments described herein with reference to drawings are explanatory and used to generally understand the present disclosure, and shall not be construed to limit the present disclosure.

The method and apparatus for providing information based on artificial intelligence (AI) according to embodiments of the present disclosure will be described below with reference to drawings.

FIG. 1 is a flow chart of a method for providing information based on AI according to an embodiment of the present disclosure.

As shown in FIG. 1, the method for providing information based on AI includes following actions.

At block 101, a characteristic of interest of a user is determined according to historical access records of the user.

In detail, the method for providing information based on AI according to embodiments of the present disclosure may be applied in any application providing information to the user, for example, a news application. The method may be configured to provide core contents of news that the user is most interested in according to the customs and interests of the user, so as to save the time for selecting the core contents by the user from massive information. Thus, operations of the user are reduced, the efficiency of acquiring information is increased, and the traffic consumed by using the application is reduced, and the cost is saved.

To illustrate the method for providing information based on AI according to embodiments of the present disclosure more clearly, a detailed description will be made by taking the method being used in a news type application (referred to as news application hereinafter) as an example.

In an embodiment, the historical access records of the user may include access records when the user accesses a certain news application or access records when the user accesses a plurality of news applications, which is not limited herein.

In detail, the historical access records of the user may include various kinds of information, such as types of news accessed by the user, titles of news accessed by the user, access time, access frequency, access duration, location where the access occurs, and types of terminal devices used for access. Accordingly, the characteristic of interest of the user may include the time, the location, the type of the terminal device and the corresponding news type.

That is, when the same news application is opened by the user at a different time, at a different location, or by a different type of terminal device, the type or contents of news that the user wants to acquire may be different.

Therefore, before block 101, the method may also include determining a scenario characteristic when the user accesses the information displaying interface, in which the scenario characteristic may include at least one of the type of terminal device used for access, the location of the user, and the current time.

Accordingly, block 101 includes determining the characteristic of interest of the user according to the scenario characteristic.

For example, when the scenario characteristic includes 8 AM to 9 AM, subway line 10, and a mobile terminal, the corresponding characteristic of interest may be sports, especially, basketball match. When the scenario characteristic includes 10 AM to 12 AM, Fortune Plaza at world trade center, and a fixed terminal, the corresponding characteristic of interest may be finance and economics, especially, stock analysis today. When the scenario characteristic includes 12 PM to 14 PM, Fortune Plaza at world trade center, and a mobile terminal, the corresponding characteristic of interest may be entertainment.

In this way, when the user opens the news application at 8:30 AM, it is acquired by the application that the location of the user is at subway line 10 and the application is executed by a mobile terminal, then the present scenario characteristic may be determined as 8 AM to 9 AM, subway line 10, and a mobile terminal, and therefore the current characteristic of interest of the user may be determined as sports (especially, basketball match).

At block 102, an information card matched with the characteristic of interest is displayed to the user in the information displaying interface, in which the information card includes core contents of news matched with the characteristic of interest determined by analyzing news in a database.

In detail, the information displaying interface is a news displaying interface in the news application. The information displaying interface may be a homepage of the news application, or may be opened when the user chooses a way of acquiring news in the news application or performs a touch operation on a service tab in the news application, which is not limited in embodiments of the present disclosure.

In addition, the database may be an internal database corresponding to the news application or an external database such as other news applications and websites, which is not limited in embodiments of the present disclosure.

In detail, since only core contents of news that the user is interested in, such as core facts of news, and backgrounds and results of events, are displayed in the information displaying interface according to the characteristic of interest of the user, core contents of the news can be acquired by the user directly, without the need for the user to analyze and screen massive news information by himself/herself, thus saving the reading time of the user and improving the efficiency of acquiring information.

Figure 2A:
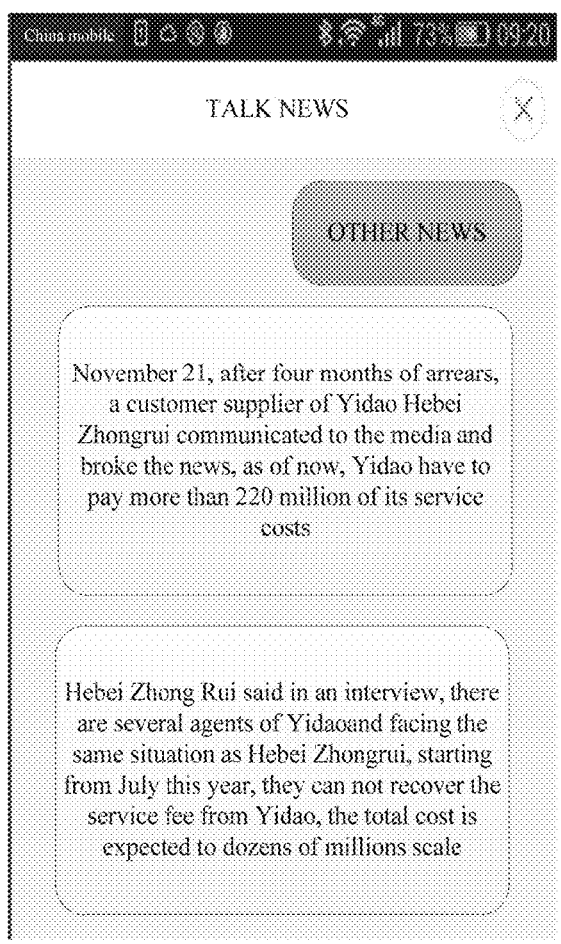
FIG. 2a is a schematic diagram illustrating an information displaying interface according to an embodiment of the present disclosure.
Figure 2B:
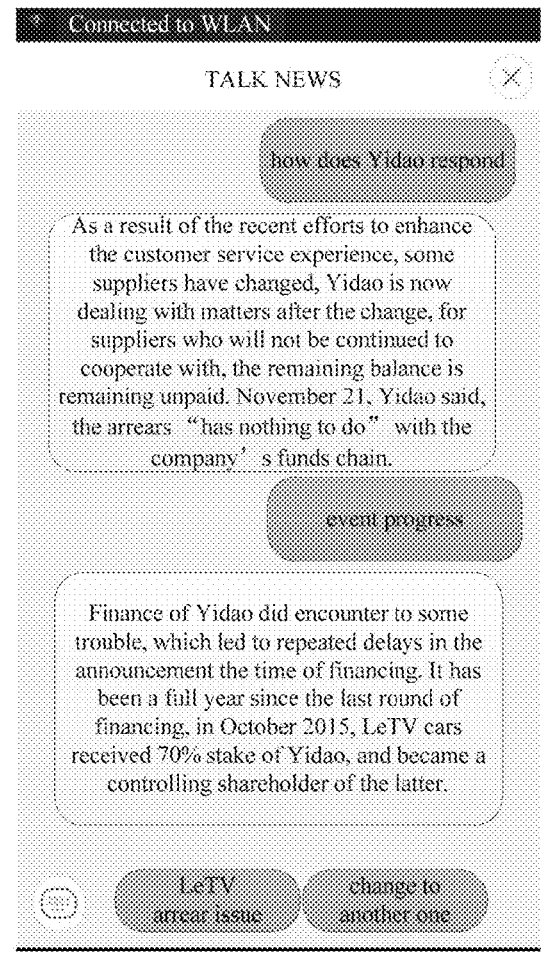
FIG. 2b is a schematic diagram illustrating an information displaying interface according to an embodiment of the present disclosure.

FIG. 2a and FIG. 2b are schematic diagrams illustrating information displaying interfaces according to an embodiment of the present disclosure. Referring to FIG. 2a, the information card displayed to the user according to the characteristic of interest of the user includes core contents of news related to "Yidao Vehicle-Sharing is in arrears of payments of suppliers", such that the user may have a general impression about the whole event according to the information card. By aggregating a plurality of similar news, extracting contents according to core facts, analysis, backgrounds and comments, and providing the core contents of the news to the user from various viewpoints, the burden of reading the whole news is eased, and the core contents of the news may not be lost, thus improving the user experience.

With the method for providing information based on AI according to embodiments of the present disclosure, the characteristic of interest of the user is determined according to historical access records of the user, and then core contents of news matched with the characteristic of interest are displayed to the user in the information displaying interface. Thus, the user may acquire core contents of news of interest directly, reducing operations and reading time of the user, increasing the efficiency of acquiring information, and reducing the traffic consumed by using the application for reading the news, and saving the cost.

It can be seen from the above analysis that the news application may analyze news in the database according to the characteristic of the user and provide core contents of news that the user is interested in, thus saving time and cost of the user. In detail, several means may be used by the news application to analyze the news in the database, so as to determine core contents of each piece of news. A detailed description of a process of determining the core contents in the method for providing information based on AI will be made as follows with reference to FIG. 3.

Figure 3:
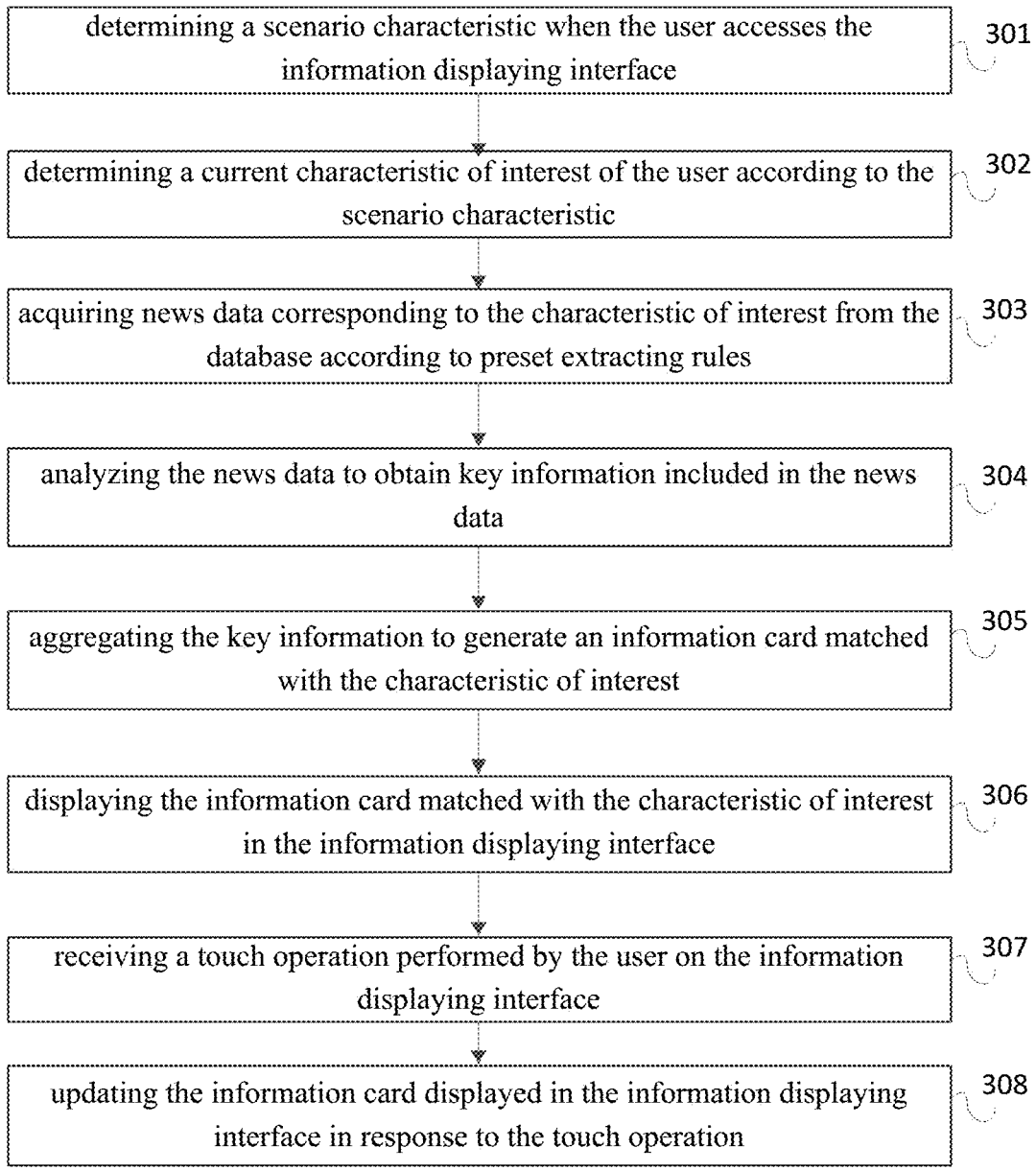
FIG. 3 is a flow chart of a method for providing information based on artificial intelligence according to an embodiment of the present disclosure.

FIG. 3 is a flow chart of a method for providing information based on AI according to an embodiment of the present disclosure.

As shown in FIG. 3, the method for providing information based on AI includes following actions.

At block 301, when the user accesses an information displaying interface, a corresponding scenario characteristic is acquired.

At block 302, a current characteristic of interest of the user is determined according to the scenario characteristic.

At block 303, news data corresponding to the characteristic of interest is acquired from the database according to preset extracting rules.

In detail, the preset extracting rules may be generated by the news application according to historical access records of the user, or may be set with respect to the news application in advance, which is not limited in embodiments of the present disclosure.

In an embodiment, when the characteristic of interest of the user is determined, corresponding search terms may be determined according to the characteristic of interest, and then news data related to the search terms are acquired from the database. Or, events corresponding to the characteristic of interest may be determined according to the characteristic of interest, and then news data related to the events are extracted from the database with the event as a granularity.

Accordingly, the above block 303 may include determining an event granularity corresponding to target news data according to the characteristic of interest, and aggregating news data in accordance with the event granularity from the database by clustering, retrieving, and/or signature.

For example, when it is determined according to the historical access records of the user that the characteristic of interest of the user is "civil service examination", the target news data may be determined as all the news events related to "civil service examination", and then all news data in accordance with the event may be aggregated by clustering, retrieving, and/or signature.

In addition, after the news data is obtained, a screening process may be performed when the amount of the news data is too big. For example, a similarity between each news release and the event may be calculated, and only news with its similarity greater than a certain threshold may be chosen. For another example, only a certain number of news may be chosen, or only news releases within a certain time range may be chosen, which is not limited in embodiments of the present disclosure.

In an embodiment, the similarity refers to a matching degree of the news and the event. In detail, the similarity may be determined according to a number of segments in the news release that fit the characteristic of interest, or an appearance frequency of segments that fit the characteristic of interest in the news release, which is not limited in embodiments of the present disclosure.

At block 304, the news data is analyzed to obtain key information included in the news data.

At block 305, the key information is aggregated to generate an information card matched with the characteristic of interest.

In detail, since the obtained news data includes news releases that contain backgrounds, time and facts related to the core contents, while the information card finally displayed only includes the core contents of the event, there is a need to analyze the news releases so as to extract key information of the core contents.

In practice, the above block 304 may include determining a structure model of the core contents corresponding to the news data according to the characteristic of interest, and breaking up sentences in the news data and extracting the key information from the news data.

Accordingly, the above block 305 includes performing a deep neural network training on the key information according to the structure model.

In detail, in order to make the core contents satisfy requirements of the user succinctly and comprehensively, core contents corresponding to different characteristics of interest may be constructed according to different structure models. For example, the core contents may be constructed according to time structure, character relation structure, facts-plus-comments structure, etc., which is not limited in embodiments of the present disclosure.

In detail, a mapping relationship between the characteristics of interest and the structure models may be preset in the news application. In this way, when a current characteristic of interest of the user is determined, a corresponding structure model may be determined by searching the preset mapping relationship, and then the key information can be extracted from the news data according to the structure model. For example, when the structure model is a time structure, time and core facts may be obtained from the news data for constructing the core contents.

Figure 4:
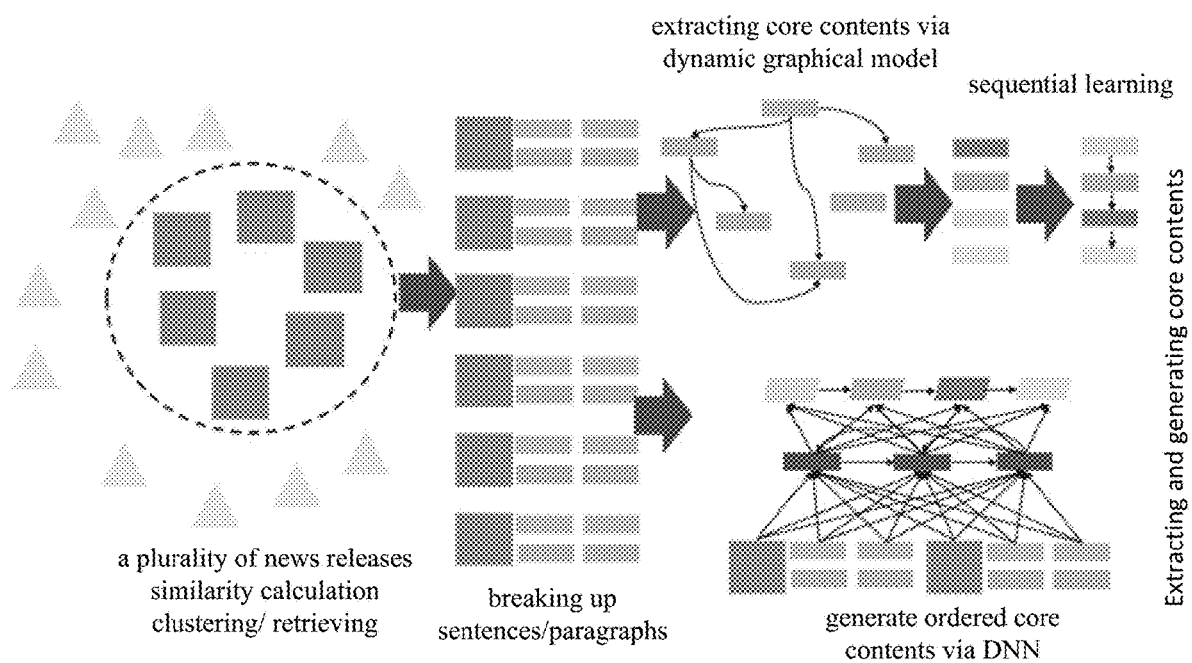
FIG. 4 is a schematic diagram illustrating determining core contents according to an embodiment of the present disclosure.

FIG. 4 is a schematic diagram illustrating determining core contents according to an embodiment of the present disclosure.

Referring to FIG. 4, when the core contents are constructed, a plurality of news releases with high similarity may be first obtained from the database by means of clustering, retrieving, and/or signature. Then, these news releases are split up into sentences and/or paragraphs, such that the key information from a plurality of viewpoints such as core facts, backgrounds, event analysis, and comments may be extracted from the split data according to the structure model by using different training models, such as a dynamic graphical model or a deep neural network (DNN) model. After that, the key information are aggregated via a sequential learning or deep neural network learning process, so as to generate ordered core contents with textual granularity.

It should be noted that, in embodiments of the present disclosure, the dynamic graphical model and the deep neural network (DNN) model are just for illustrating. In practice, any models that can perform the aggregation training on the information may be chosen according to the structure model corresponding to the characteristic of interest, such that the key information is trained to generate ordered core contents.

At block 306, an information card matched with the characteristic of interest is displayed to the user in the information displaying interface.

In addition, since one information card can only contain limited information, in order to fulfill needs of the user to acquire more information, in an embodiment, a conversation interaction may be provided in the information displaying interface. Through the conversation interaction, other contents related or similar to the information card may be provided to the user, or other kinds of information cards may be provided to the user. That is, after the above block 306, the method may include following actions.

At block 307, a touch operation performed by the user on the information displaying interface is received.

At block 308, the information card displayed in the information displaying interface is updated in response to the touch operation.

In detail, the touch operation performed by the user on the information displaying interface may refer to inputting a new search term or instruction via speech or text, or may refer to a sliding or clicking operation performed by the user on the information card displayed in the news displaying interface.

In an embodiment, when the news application generates the information card matched with the characteristic of interest according to the characteristic of interest of the user, it may also generate a guide card linked to other news related to the core contents of the information card and display the guide card in the information display interface. Therefore, when the guide card is clicked by the user, it may switch to another information card, or news related to the information card may be further acquired. That is, the above block 107 may also include receiving a selecting operation performed by the user on the guide card.

In an embodiment, the guide card is configured to guide the user to have a full understanding of the event corresponding to the currently displayed information card, or guide the user to obtain other information related to or similar to the currently displayed information card. Therefore, the user can fully know all the core contents of the event directly through guidance of the guide card, without the need of analyzing the event by himself.

In detail, the guide card may be at the top, bottom or any other location of the information displaying interface. The number of the guide cards and forms of the cards may be set according to actual requirements. For example, when the number of the guide cards is relatively large, the guide cards may be set in a form of drop-down list or prompt box, which is not limited in embodiments of the present disclosure.

For example, when the information displaying interface also includes guide cards of "other news" and "how does Yidao respond" besides the information card displaying the core contents "Yidao Vehicle-Sharing is in arrears of payments of suppliers" as shown in FIG. 2a, and the user selects the guide card of "how does Yidao respond", core contents corresponding to the guide card "how does Yidao respond" may be displayed on the information displaying interface, as shown in FIG. 2b. Furthermore, when the user further clicks the guide card of "event progress", core contents corresponding to the guide card "event progress" may be displayed on the information displaying interface.

Since contents of the information cards displayed on the information displaying interface are obtained by aggregating data in the database, the user can learn important aspects of the event by browsing a few information cards.

In addition, since "LeTV" is a main controlling shareholder of "Yidao", referring to FIG. 2b, besides the information card of the event, guide cards of other events related to the event may also be displayed in the information displaying interface, such as "LeTV arrear issue", "change to another one", and "another one". Thus, the user may acquire more other information by clicking the guide cards.

By providing guide items related to the current news, the user may learn other news information related to the event. Comparing to conventional news service, the related guide items may provide refined summarization and abstract of the news contents, which may be more visual to the user. Moreover, the user may directly input a topic of interest in an input box provided in the information displaying interface, such that the user may actively find contents related to the current news event from other viewpoints, making the user deep in content.

Furthermore, when the news displays the information card to the user according to the characteristic of interest of the user, an optimizing process may be performed on the characteristic of interest in response to a touch operation of the user, so as to provide more accurate information card to the user.

Figure 5:
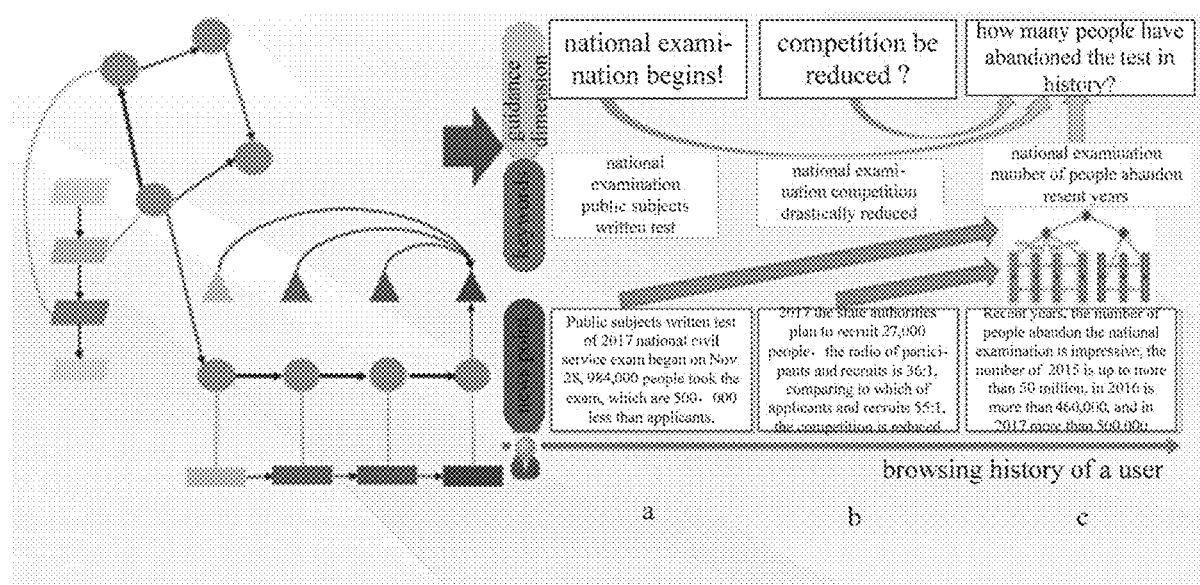
FIG. 5 is a schematic diagram illustrating an optimizing process for providing information according to an embodiment of the present disclosure.

For example, FIG. 5 is a schematic diagram illustrating an optimizing process for providing information according to an embodiment of the present disclosure.

As shown in FIG. 5, if a guidance dimension of the guide card firstly determined according to the characteristic of interest of the user is "national examination begins!", the news item determined according to keywords "national examination" and " written tests of public subjects" is illustrated as box "a" in FIG. 5. Then, if a guidance dimension of the guide card selected by the user is "competition be reduced?", the news item determined according to keywords "national examination", "competition" and "drastically reduced" is illustrated as box "b" shown in FIG. 5. Then, the optimizing process may be performed on the characteristic of interest, and a guidance dimension "how many people have abandoned the test in history?" of the guide card is determined. Next, news data is acquired from a corresponding database according to keywords "national examination", "number of people abandoning the text" and "recent years", and the news data are trained by a deep neural network model, and the news item illustrated as box "c" in FIG. 5 is determined.

With recommending news best satisfying the interest to the user according to reading history of the user and by a deep learning algorithm, and adjusting and optimizing contents of the information card in response to feedback from the user, the user experience is improved, the time for browsing news is saved, and the efficiency of acquiring core contents of the news is increased.

With the method for providing information based on AI according to the present embodiment, firstly, the characteristic of interest of the user is determined according to historical access records of the user. Then, news data corresponding to the characteristic of interest of the user is acquired from the database. Next, the news data is analyzed and aggregated by using the corresponding training model, so as to obtain the core contents corresponding to the characteristic of interest of the user. The core contents are displayed in the information displaying interface in a form of information card, and during the information displaying process, the information card in the information displaying interface may be updated in response to the touch operation of the user. Thus, the user may acquire core contents of news of interest directly, reading operations and reading time of the user, increasing the efficiency of acquiring information, reducing the traffic consumed by using the application for reading the news, and saving the cost. In addition, by providing information cards by means of conversation, the user may use the news application to acquire various kinds of information, and by updating the characteristic of interest according to a feedback from the user, the accuracy of displaying information to the user is increased, thus improving the user experience.

To provide a more visual description of the method for providing information based on AI according to the present disclosure, the technical principle of the method for providing information based on AI according to embodiments of the present disclosure will be illustrated with reference to FIG. 6 as follows.

Figure 6:
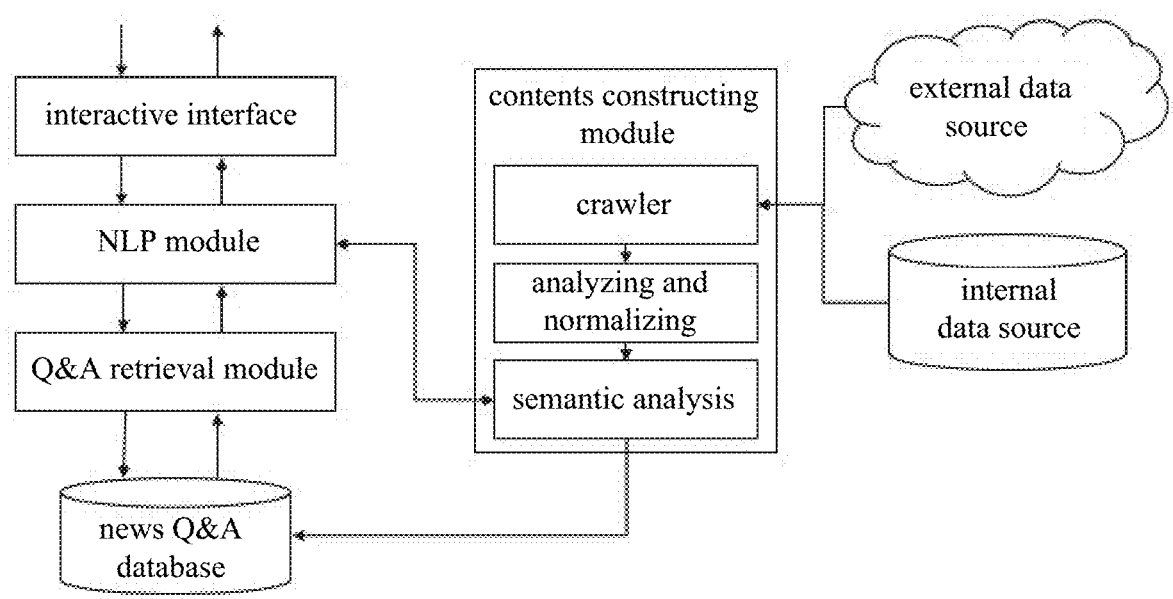
FIG. 6 is a schematic diagram illustrating a technical principle of a method for providing information based on artificial intelligence according to an embodiment of the present disclosure.

FIG. 6 is a schematic diagram illustrating a technical principle of a method for providing information based on AI according to an embodiment of the present disclosure.

As illustrated in FIG. 6, the user may send a news acquiring request to the news application via an "interactive interface" of the news application, for example, by clicking the guide card, or by speech input. Then, the news application may analyze the request input by the user via a natural language understanding (NLP) module, and acquire an information card corresponding to the request from a news Q&A (questions and answers) database via a Q&A retrieval module. In addition, after analyzing the request input by the user, the NLP module sends the request to a content constructing module. The content constructing module may acquire data corresponding to the request of the user from an external data source (for example, Baidu zhidao) or an internal data source (e.g. a news database) by a crawler, and then perform processing such as analysis, normalization and semantic understanding on the acquired data to generate an information card corresponding to the request of the user.

It can be seen from FIG. 6, the NLP module is mainly configured to understand intents of the search word input by the user, including a functional intent, a news intent, a non-news intent, etc., in which the news intent may include identification of an inside and an outside of the event. Basic NLP tools such as segmentation, proper noun, and dependency analysis may be integrated into an underlying algorithm. The Q&A retrieval module is generally configured to extract contents that best match with the intents of the user from various downstream data (for example encyclopedia, high quality questions and answers, news database, etc.) and return the contents as a result.

With this way of providing information, by aggregating a plurality of similar news, extracting contents according to core facts, analysis, backgrounds and comments, and providing the core contents of the news to the user from various viewpoints, the burden of reading the whole news is eased, and the core contents of the news may not be lost, thus improving the user experience. By providing guide items related to the current news, the user may learn other news information related to the event. Comparing to conventional news service, the related guide items may provide refined summarization and abstract of the news contents, which may be more visual to the user. By providing the input box to the user, the user may search for a topic of interest directly, and moreover the user may actively find contents related to the current news event from other viewpoints, making the user deep into content.

To achieve the above embodiments, the present disclosure also provides an apparatus for providing information based on AI.

Figure 7:
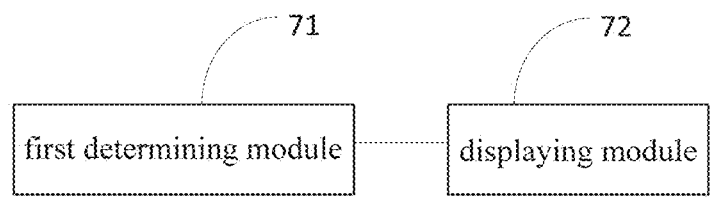
FIG. 7 is a block diagram illustrating an apparatus for providing information based on artificial intelligence according to an embodiment of the present disclosure.

FIG. 7 is a block diagram illustrating an apparatus for providing information based on AI according to an embodiment of the present disclosure.

As shown in FIG. 7, the apparatus for providing information based on AI includes a first determining module 71 and a displaying module 72.

The first determining module 71 is configured to determine a characteristic of interest of a user according to historical access records of the user.

The displaying module 72 is configured to display an information card matched with the characteristic of interest of the user in an information displaying interface, in which the information card includes core contents of news matched with the characteristic of interest determined by analyzing news in a database.

It should be understood that the descriptions of the method for providing information based on AI in the above embodiments may also be applied to the apparatus for providing information based on AI according to embodiments of the present disclosure, which will not be elaborated here.

With the apparatus for providing information based on AI according to embodiments of the present disclosure, the characteristic of interest of the user is determined according to historical access records of the user, and then core contents of news matched with the characteristic of interest are displayed to the user in the information displaying interface. Thus, the user may acquire core contents of news of interest directly, reducing operations and reading time of the user, increasing the efficiency of acquiring information, reducing the traffic consumed by using the application for reading the news, and saving the cost.

Figure 8:
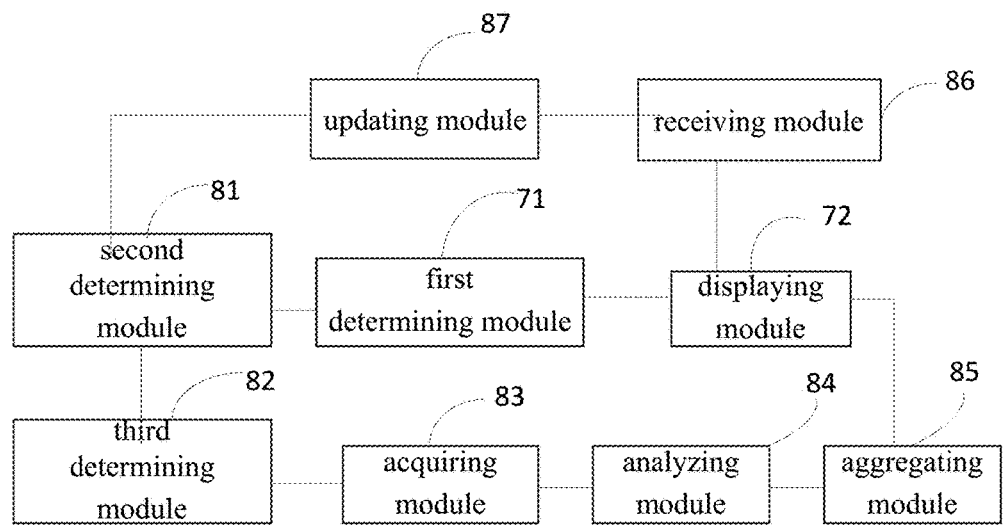
FIG. 8 is a block diagram illustrating an apparatus for providing information based on artificial intelligence according to another embodiment of the present disclosure.

FIG. 8 is a block diagram illustrating an apparatus for providing information based on artificial intelligence according to another embodiment of the present disclosure. As shown in FIG. 8, on the basis of the embodiment illustrated with reference to FIG. 7, the apparatus may further include a second determining module 81 and a third determining module 82.

The second determining module 81 is configured to determine a scenario characteristic when the user accesses the information displaying interface, in which the scenario characteristic may include at least one of a type of a terminal device, the location of the user, and the current time.

The third determining module 82 is configured to determine a current characteristic of interest of the user according to the scenario characteristic.

In an embodiment, the apparatus may further include an acquiring module 83, an analyzing module 84 and an aggregating module 85.

The acquiring module 83 is configured to acquire news data corresponding to the characteristic of interest from the database according to preset extracting rules.

The analyzing module 84 is configured to analyze the news data to obtain key information included in the news data.

The aggregating module 85 is configured to aggregate the key information to generate an information card matched with the characteristic of interest.

The acquiring module 83 is specifically configured to determine an event granularity corresponding to target news data according to the characteristic of interest, and aggregate news data in conformity with the event granularity from the database by means of clustering, retrieving, and/or signature.

The analyzing module 84 is specifically configured to determine a structure model of the core contents corresponding to the news data according to the characteristic of interest, and split the news data up into sentences and extracting the key information from the news data.

Accordingly, the aggregating module 85 is specifically configured to perform a deep neural network training on the key information according to the structure model.

In addition, in an embodiment of the present disclosure, the apparatus for providing information based on AI may further include a receiving module 86 and an updating module 87.

The receiving module 86 is configured to receive a touch operation performed by the user on the information displaying interface.

The updating module 87 is configured to update the information card displayed on the information displaying interface in response to the touch operation.

In an embodiment, the receiving module 87 is specifically configured to receive an input operation performed by the user on the information displaying interface, or receive a touch operation performed by the user on the information card. Or, when the information displaying interface includes a guide card, the receiving module 87 may receive a selecting operation performed by the user on the guide card.

Alternatively, the apparatus may further include an optimizing module configured to optimize the characteristic of interest of the user in response to the touch operation.

It should be understood that the descriptions of the method for providing information based on AI in the above embodiments may also be applied to the apparatus for providing information based on AI according to embodiments of the present disclosure, which will not be elaborated here.

With the apparatus for providing information based on AI according to the present embodiment, firstly, the characteristic of interest of the user is determined according to historical access records of the user. Then, news data corresponding to the characteristic of interest of the user is acquired from the database. Next, the news data is analyzed and aggregated by using the corresponding training model, so as to obtain the core contents corresponding to the characteristic of interest of the user. The core contents are displayed in the information displaying interface in a form of information card, and during the information displaying process, the information card in the information displaying interface may be updated in response to the touch operation of the user. Thus, the user may acquire core contents of news of interest directly, reading operations and reading time of the user, increasing the efficiency of acquiring information, reducing the traffic consumed by using the application for reading the news, and saving the cost. In addition, by providing information cards by means of conversation, the user may use the news application to acquire various kinds of information, and by updating the characteristic of interest according to a feedback from the user, the accuracy of displaying information to the user is increased, thus improving the user experience.

Based on the method and apparatus for providing information based on AI according to above embodiments, a device for providing information based on AI is provided according to another aspect of the present disclosure.

The device for providing information based on AI may be any electronic device in which an application may be installed, such as a mobile phone, a PDA, a PC, etc. A structure of the device for providing information based on AI will be described with reference to a mobile phone illustrated in FIG. 9.

Figure 9:
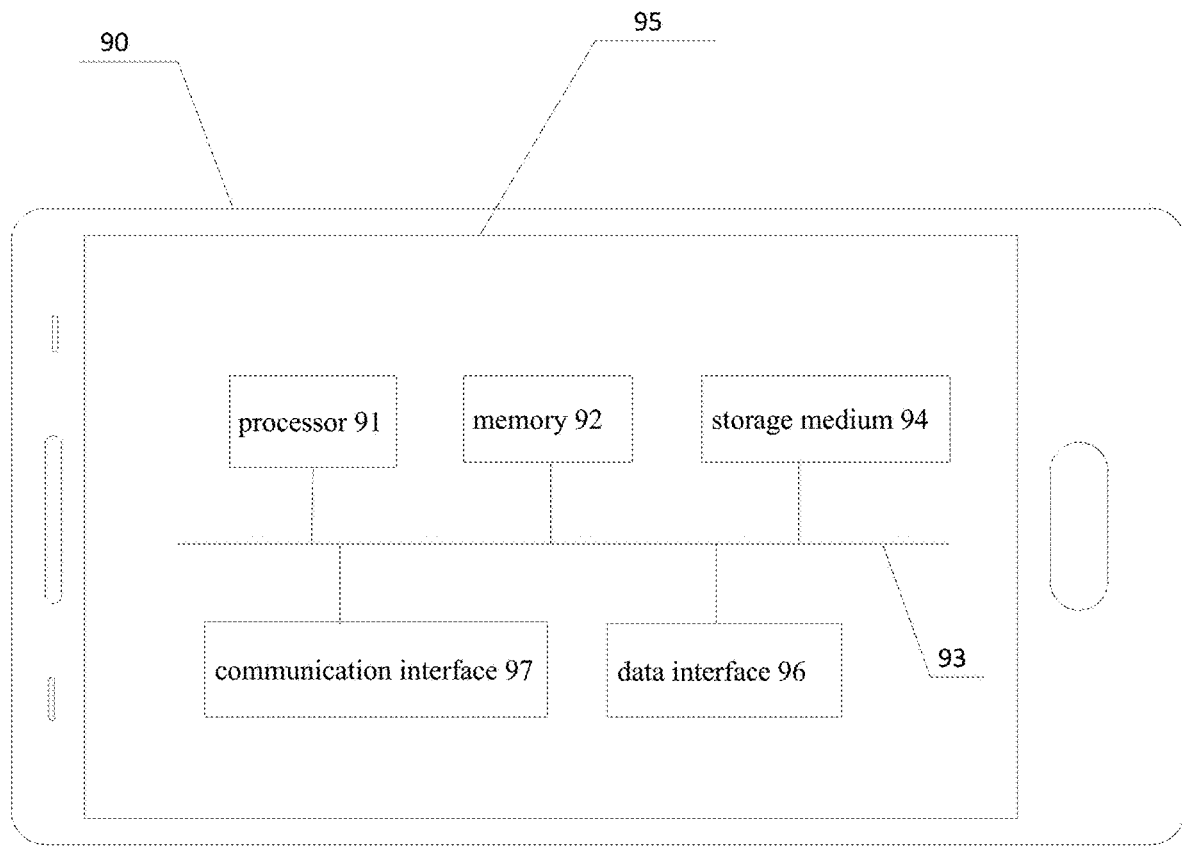
FIG. 9 is a block diagram illustrating a device for providing information based on artificial intelligence according to an embodiment of the present disclosure.

FIG. 9 is a block diagram illustrating a device for providing information based on artificial AI according to an embodiment of the present disclosure.

In the present embodiment, FIG. 9 is only illustrated as an example, and should not be considered as any restriction on the function and the range of application of embodiments of the present disclosure.

As shown in FIG. 9, the device 9 for providing information based on AI is expressed in the form of a general-purpose mobile phone apparatus. The device 9 may include, but is not limited to, a processor 91, a memory 92, and a bus 93 connecting different system components (including the memory 92 and the processor 91). The bus 93 represents one or more of several types of bus architectures including a memory bus or a memory control bus, a peripheral bus, a graphic acceleration port (GAP) bus, a processor bus, or a local bus using any bus architecture in a variety of bus architectures.

For example, these architectures include, but are not limited to, an industry standard architecture (ISA) bus, a micro-channel architecture (MCA) bus, an enhanced ISA bus, a video electronic standards association (VESA) local bus, and peripheral component interconnect (PCI) bus.

The memory 92 may include a non-transitory computer-readable medium, such as a random access memory (RAM) and/or a cache memory.

In addition, the device 9 for providing information based on AI may further include other movable/non-removable, transitory/non-transitory storage medium 94. For example, the storage medium 94 may be used to read from and write into non-removable, non-volatile magnetic mediums (not shown, commonly referred to as "hard disk drives"). Although not shown in the figure, a disk driver for reading from and writing into removable and non-volatile disks (e.g. "floppy disks"), as well as an optical driver for reading from and writing into movable and non-volatile optical disks (e.g. CD-ROMs, DVD-ROMs, or other optical mediums) may be provided. In these cases, each driver may be connected to the bus 93 via one or more data medium interfaces. The memory 92 may include at least one program product, which has a set of program modules configured to perform the functions of embodiments of the present disclosure.

The device for providing information based on AI further includes a display screen 95 and a data interface 96, so that the user can perform an interactive communicate with the device.

Further, the device for providing information based on AI further includes a communication interface 97 for communicating with another device (such as a server or the like)

through a communication network, so as to obtain information data from the server through the communication interface 97.

When the device for providing information based on AI is in use, the processor 91 can perform various function applications and data processing, for example, perform the method for providing information based on AI, by executing a program stored in the system memory 92.

Further, embodiments of the present disclosure also provide a computer-readable storage medium, stored with computer programs that, when executed by a processor, perform the above methods for providing information based on artificial intelligence.

In detail, the storage medium may include any combination of one or more computer-readable mediums. The computer-readable medium may be a computer-readable signal medium or a computer-readable storage medium. The computer readable storage medium can include, but not limited to, electronic, magnetic, optical, electromagnetic, infrared, semiconductor system, apparatus or device, or a combination thereof.

More specific examples of the computer-readable medium include but are not limited to: an electronic connection (an electronic device) with one or more wires, a portable computer enclosure (a magnetic device), a random access memory (RAM), a read-only memory (ROM), an erasable programmable read-only memory (EPROM or a flash memory), an optical fiber device and a portable compact disk read-only memory (CDROM), or any combination thereof. In the present disclosure, the computer-readable storage medium may be any tangible medium that contains or stores a program that may be used by or in conjunction with an instruction execution system, apparatus, or device.

The computer-readable signal medium may comprise a data signal propagating in the baseband or as part of the carrier, and the data signal may carry computer-readable program codes. Such propagated data signals may take a variety of forms including, but not limited to, electromagnetic signals, optical signals, or any suitable combination thereof. The computer-readable signal medium may also be any computer-readable medium other than a computer-readable storage medium that may send, disseminate, or transmit a program that may be used by or in conjunction with an instruction execution system, apparatus, or device.

The program code contained in the computer-readable medium may be transmitted by any suitable medium, including but not limited to manners such as wireless, wire, cable, RF, etc., or any suitable combination thereof The computer program code for performing the operation of the present disclosure may be written in one or more programming languages or a combination thereof, the programming languages include object-oriented programming languages such as Java, Smalltalk, C++, and also conventional procedural programming languages such as "C" language or similar programming language. The program code may be executed entirely on the user's computer, partially executed on the user's computer, executed as a separate software package, partially on the user's computer, partially on a remote computer, or entirely on a remote computer or server. In the case of a remote computer, the remote computer may be connected to a user computer via any type of network, including a local area network (LAN) or a wide area network (WAN), or may be connected to an external computer (e.g., through Internet connection provided by an Internet service provider (ISP)).

Reference throughout this specification to "an embodiment", "some embodiments", "an example", "a specific example", or "some examples" means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Furthermore, the particular features, structures, materials, or characteristics may be combined in any suitable manner in one or more embodiments or examples. In addition, those skilled in the art could combine or associate different embodiments, examples or characters of different embodiments or examples, as long as there are no contradictories.

In addition, terms such as "first" and "second" are used herein only for purposes of description and are not intended to indicate or imply relative importance or significance or to imply the number of indicated technical features. Thus, the feature defined with "first" and "second" may comprise one or more of this feature either in a way of imply or indicate. In the description of the present disclosure, "a plurality of" means two or more than two, for example, two, there etc. , unless specifically and particularly prescribed otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, wherein the order of execution may differ from that which is depicted or discussed, including according to involved function, executing concurrently or with partial concurrence or in the contrary order to perform the function, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer-readable medium comprise but are not limited to: an electronic connection (an electronic device) with one or more wires, a portable computer enclosure (a magnetic device), a random access memory (RAM), a read-only memory (ROM), an erasable programmable read-only memory (EPROM or a flash memory), an optical fiber device and a portable compact disk read-only memory (CDROM). In addition, the computer-readable medium may even be a paper or other appropriate medium capable of printing programs thereon, this is because, for example, the paper or other appropriate mediums may be optically scanned and then edited, decrypted or processed with other appropriate methods when necessary to obtain the programs in an electric manner, and then the programs may be stored in the computer memories.

It should be understood that each part of the present disclosure may be realized by hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs, the programs may be stored in a computer-readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer-readable storage medium.

The storage medium mentioned above may be read-only memories, magnetic disks, CD, etc. Although embodiments of present disclosure have been shown and described above, it should be understood that above embodiments are just explanatory, and cannot be construed to limit the present disclosure, for those skilled in the art, changes, alternatives, and modifications can be made in the embodiments without departing from spirit, principles, and scope of the present disclosure.

What is claimed is:

1. A method for providing information based on artificial intelligence, comprising:
   determining a characteristic of interest of a user according to historical access records of the user;
   acquiring news data corresponding to the characteristic of interest from a database according to preset extracting rules;
   analyzing the news data to obtain key information contained in the news data, wherein analyzing the news data to obtain key information contained in the news data comprises: determining a structure model of core contents corresponding to the news data according to the characteristic of interest; and splitting the news data up into sentences and extracting the key information from the news data according to the structure model;
   aggregating the key information to generate an information card matched with the characteristic of interest, wherein, aggregating the key information comprises: performing a deep neural network training on the key information according to the structure model; and
   displaying the information card matched with the characteristic of interest in an information displaying interface, the information card comprising core contents of news matched with the characteristic of interest determined by analyzing news in the database.

2. The method according to claim 1, before determining the characteristic of interest of the user according to historical access records of the user, further comprising:
   determining a scenario characteristic when the user accesses the information displaying interface, the scenario characteristic comprising at least one of a type of a terminal device, a location of the user, and a current time;
   determining the characteristic of interest of the user according to the scenario characteristic.

3. The method according to claim 1, wherein, acquiring news data corresponding to the characteristic of interest from the database according to preset extracting rules comprises:
   determining an event granularity corresponding to target news data according to the characteristic of interest; and
   aggregating news data in conformity with the event granularity from the database by means of clustering, retrieving, and/or signature.

4. The method according to claim 1, after displaying the information card matched with the characteristic of interest to the user in the information displaying interface, further comprising:
   receiving a touch operation performed by the user on the information displaying interface;
   updating the information card displayed in the information displaying interface in response to the touch operation.

5. The method according to claim 4, wherein, the information displaying interface comprises a guide card,
   receiving a touch operation performed by the user on the information displaying interface comprises:
   receiving an input operation performed by the user on the information displaying interface; or
   receiving a touch operation performed by the user on the information card; or
   receiving a selecting operation performed by the user on the guide card.

6. The method according to claim 4, after receiving a touch operation performed by the user on the information displaying interface, further comprising:
   optimizing the characteristic of interest of the user in response to the touch operation.

7. An apparatus for providing information based on artificial intelligence, comprising:
   a processor;
   a memory, configured to store one or more software modules executable by the user,
   wherein the one or more software modules comprise:
   a first determining module, configured to determine a characteristic of interest of a user according to historical access records of the user;
   a displaying module, configured to display an information card matched with the characteristic of interest in an information displaying interface, the information card comprising core contents of news matched with the characteristic of interest determined by analyzing news in a database;
   an acquiring module, configured to acquire news data corresponding to the characteristic of interest from the database according to preset extracting rules;
   an analyzing module, configured to analyze the news data to obtain key information contained in the news data, wherein analyzing the news data to obtain key information contained in the news data comprises: determining a structure model of core contents corresponding to the news data according to the characteristic of interest; and splitting the news data up into sentences and extracting the key information from the news data according to the structure model; and an aggregating module, configured to aggregate the key information to generate the information card matched with the characteristic of interest, wherein, aggregating the key information comprises: performing a deep neural network training on the key information according to the structure model.

8. The apparatus according to claim 7, wherein the one or more software modules further comprise:
   a second determining model, configured to determine a scenario characteristic when the user accesses the information displaying interface, the scenario characteristic comprising at least one of a type of terminal device, a location of the user, and a current time;
   a third determining model, configured to determine the characteristic of interest the user according to the scenario characteristic.

9. The apparatus according to claim 7, wherein, the acquiring module is configured to:
   determine an event granularity corresponding to target news data according to the characteristic of interest; and
   aggregate news data in conformity with the event granularity from the database by means of clustering, retrieving, and/or signature.

10. The apparatus according to claim 7, wherein the one or more software modules further comprise:
    a receiving module, configured to receive a touch operation performed by the user on the information displaying interface; and
    an updating module, configured to update the information card displayed in the information displaying interface in response to the touch operation.

11. The apparatus according to claim 10, wherein, the information displaying interface comprises a guide card, and the receiving module is configured to:
    receive an input operation performed by the user on the information displaying interface; or
    receive a touch operation performed by the user on the information card; or
    receive a selecting operation performed by the user on the pilot card.

12. The apparatus according to claim 10, wherein the one or more software modules further comprise:
    an optimizing module, configured to optimize the characteristic of interest of the user in response to the touch operation.

13. A computer-readable storage medium, stored with computer programs that, when executed by a processor, cause the processor to perform a method for providing information based on artificial intelligence, the method comprising:
    determining a characteristic of interest of a user according to historical access records of the user;
    acquiring news data corresponding to the characteristic of interest from a database according to preset extracting rules;
    analyzing the news data to obtain key information contained in the news data, wherein analyzing the news data to obtain key information contained in the news data comprises: determining a structure model of core contents corresponding to the news data according to the characteristic of interest; and splitting the news data up into sentences and extracting the key information from the news data according to the structure model;
    aggregating the key information to generate an information card matched with the characteristic of interest, wherein, aggregating the key information comprises: performing a deep neural network training on the key information according to the structure model; and
    displaying an information card matched with the characteristic of interest in an information displaying interface, the information card comprising core contents of news matched with the characteristic of interest determined by analyzing news in a database.

14. The computer-readable storage medium according to claim 13, before determining the characteristic of interest of the user according to historical access records of the user, the method further comprising:
    determining a scenario characteristic when the user accesses the information displaying interface, the scenario characteristic comprising at least one of a type of a terminal device, a location of the user, and a current time;
    determining the characteristic of interest of the user according to the scenario characteristic.

15. The computer-readable storage medium according to claim 13, wherein, acquiring news data corresponding to the characteristic of interest from the database according to preset extracting rules comprises:
    determining an event granularity corresponding to target news data according to the characteristic of interest; and
    aggregating news data in conformity with the event granularity from the database by means of clustering, retrieving, and/or signature.

16. The computer-readable storage medium according to claim 13, after displaying the information card matched with the characteristic of interest to the user in the information displaying interface, the method further comprising:
    receiving a touch operation performed by the user on the information displaying interface;
    updating the information card displayed in the information displaying interface in response to the touch operation.

17. The computer-readable storage medium according to claim 16, wherein, the information displaying interface comprises a guide card,
    receiving a touch operation performed by the user on the information displaying interface comprises:
    receiving an input operation performed by the user on the information displaying interface; or
    receiving a touch operation performed by the user on the information card; or
    receiving a selecting operation performed by the user on the guide card.

18. The computer-readable storage medium according to claim 16, after receiving a touch operation performed by the user on the information displaying interface, the method further comprising:
    optimizing the characteristic of interest of the user in response to the touch operation.

* * * * *